United States Patent [19]
Salem et al.

[11] Patent Number: 5,601,704
[45] Date of Patent: Feb. 11, 1997

[54] AUTOMATIC FEEDBACK CONTROL SYSTEM FOR A WATER TREATMENT APPARATUS

[75] Inventors: Eli Salem, Deal; Frank Morenski, Sparta, both of N.J.

[73] Assignee: The Graver Company, Union, N.J.

[21] Appl. No.: 225,650

[22] Filed: Apr. 11, 1994

[51] Int. Cl.⁶ ................................................ C02F 1/52
[52] U.S. Cl. .................... 210/86; 210/104; 210/112; 210/143; 210/195.1; 210/208; 364/502
[58] Field of Search .................... 210/709, 713, 210/86, 104, 112, 143, 194, 195.1, 195.3, 205, 207, 208; 364/500, 502

[56] References Cited

U.S. PATENT DOCUMENTS

| 3,397,788 | 8/1968 | Duff et al. | 210/195 |
|---|---|---|---|
| 3,473,665 | 10/1969 | Duff | 210/188 |
| 3,923,652 | 12/1975 | Condolios et al. | 210/112 |
| 3,929,640 | 12/1975 | Dohnert | 210/195 |
| 3,951,806 | 4/1976 | Young | 210/197 |
| 4,273,658 | 6/1981 | Karman | 210/709 |
| 4,376,045 | 3/1983 | Siskind | 210/134 |
| 5,080,803 | 1/1992 | Bagatto et al. | 210/709 |
| 5,324,431 | 6/1994 | Watanabe et al. | 210/614 |
| 5,340,468 | 8/1994 | Hawthorne et al. | 210/96.1 |

OTHER PUBLICATIONS

Royce Instrument Corp., Catalog, Sections 1–7, Various Dates.
Graver Water, Form 05–358 Entitled "Gravaer Reactivator®" (1 Page, Jun. 1984).
Graver Water Manual Entitled "Field Instructions For The Erection And Internal Assembly Of The Graver Reactivator®", pp. 1–10, Feb. 1978.
Ecodyne, Form 05–215–11/6, Entitled "Automatic Desludging Controls For Graver Reactivator" (1 Page, Undated).
Graver Water, Form 05–083, Entitled "Automatic Desludging Controls for Graver Reactivator" (1 Page, Undated).
Ecodyne, Print T–30787, Entitled "Packaged Reactivator Water Plant" (1 Page, Jan. 1980).

Primary Examiner—Peter A. Hruskoci
Attorney, Agent, or Firm—Dressler, Goldsmith, Milanmow & Katz, Ltd.

[57] ABSTRACT

An automatic feedback control system for a water treatment apparatus, such as a recirculating solids contact clarifier, that maintains steady-state operation of the clarifier by accurately measuring the concentration of suspended solids at designated portions of the clarifier and automatically adjusting clarifier variables to maintain optimum conditions despite changes in the inlet flow rate, composition or temperature.

17 Claims, 4 Drawing Sheets

AUTOMATIC FEEDBACK CONTROL SYSTEM FOR A WATER TREATMENT APPARATUS

FIELD OF THE INVENTION

The present invention relates generally to water treatment apparatus and, more particularly, to a method and apparatus for providing an automatic feedback control system for a clarifier, such as a recirculating solids contact clarifier, that maintains steady-state operation of the clarifier by accurately measuring the concentration of suspended solids at designated points in the clarifier and automatically adjusting clarifier variables to maintain optimum operating conditions with no substantial delay despite any changes that may occur in the raw water inlet flow rate, composition or temperature.

BACKGROUND OF THE INVENTION

In the treatment and clarification of raw water in a clarifier, such as a recirculating solids contact clarifier, or any other sedimentation apparatus employing one or more liquid treatment zones, suspended solid particles within the raw water act as "seed" or nuclei. Newly formed precipitates adhere to such particles creating a smaller number of larger, more dense and easily settled particles. Previously formed precipitates act as the "seed" to speed the reaction between the incoming raw water and treatment chemicals added to the system.

Examples of such apparatus are disclosed in U.S. Pat. Nos. 3,473,665 and 3,951,806, both of which are assigned to the same assignee as the present invention. These apparatus recirculate settled precipitates or "sludge" upwardly into an uptake or reaction zone for mixing with the incoming raw water and chemical treating agents which can be introduced within the reaction zone in desired concentrations.

In order to ensure an optimum rate of recirculated precipitates to accomplish coagulation and clarification, a variety of variables within the system must be monitored and maintained at desired levels. The primary variables which must be so controlled include the concentration of suspended solids within the reaction zone; the speed of a recirculator member typically positioned within the reaction zone; the type, concentration and amount of chemicals being added within the reaction zone; the frequency and duration of sludge removal or "blow off" from the separation or sedimentation zone as well as sludge inventory and density. Additional variables include, among others, the raw water inlet flow rate, composition and temperature.

Typically, set up and adjustment of existing recirculation solids clarifiers is conducted manually. Samples are periodically manually drawn from respective portions of the clarifier and analyzed to determine the amount of suspended solids concentration.

Based on the laboratory results, an attendant, relying primarily on experience, makes adjustments to one or more variables such as the speed of the recirculator member, the chemical input, the sludge blow off frequency and duration as well as the inlet and outlet flow rates. Following a prescribed time period, which can be up to twelve hours, samples are again drawn from respective portions of the clarifier for lab analysis.

The above described process is not very reliable due to a number of factors including the level of experience of the operator, the frequency of samples drawn, the accuracy and interpretation of the lab analysis, and the time in which it takes to determine and correct a potential problem. Returning the clarifier to optimum operating conditions following a change in the system can take a substantial amount of time during which the flow exiting the clarifier will not be up to prescribed standards.

It therefore would be desirable to provide a method and apparatus including an automatic feedback control system for a clarifier, such as a recirculating solids contact clarifier, that maintains steady-state operation of the clarifier by accurately measuring the concentration of suspended solids at designated points in the clarifier and automatically adjusting clarifier variables to maintain optimum operating conditions with no substantial delay despite any changes that may occur in the raw water inlet flow rate, composition, or temperature.

SUMMARY OF THE INVENTION

The invention provides a method and apparatus for providing an automatic feedback control system for a clarifier such as a recirculating solids contact clarifier, or any other sedimentation apparatus employing one or more liquid treatment zones. The system employs one or more suspended solids concentration measuring devices positioned at designated portions of the clarifier for measuring the concentration of suspended solids present in the clarifier at that particular portion.

The sensors preferably are ultrasonic sensors whose outputs can be processed to provide a profile of the solids concentration throughout the entire depth of the clarifier. The outputs also can be connected for operable communication with a central processing unit (CPU) which controls a recirculating member, an adjustable chemical inlet, an adjustable sludge blow off frequency and duration outlet and an adjustable raw water inlet rate.

Once the clarifier is filled with raw water to be treated, manual tests are taken to determine the concentrations of suspended solids in various portions of the clarifier. Base upon those manual tests, adjustments are made to the recirculator, chemical inlet, sludge blow off outlet and raw material inlet to establish a steady-state operating condition of the clarifier.

Upon establishing steady-state operation, a plurality of set points are entered into the CPU based on the outputs of the ultrasonic sensors. If during continued operation the outputs of the sensors deviate from the set points, the CPU either sounds an alarm to alert an operator or automatically adjusts the recirculator speed, chemical inlets, sludge blow off outlet and/or raw material inlet until the desired sensor outputs are reestablished.

Other features and advantages of the present invention will become readily apparent from the following description, the accompanying drawings and the appended claims.

DESCRIPTION OF THE PREFERRED EMBODIMENTS

Figure 1:
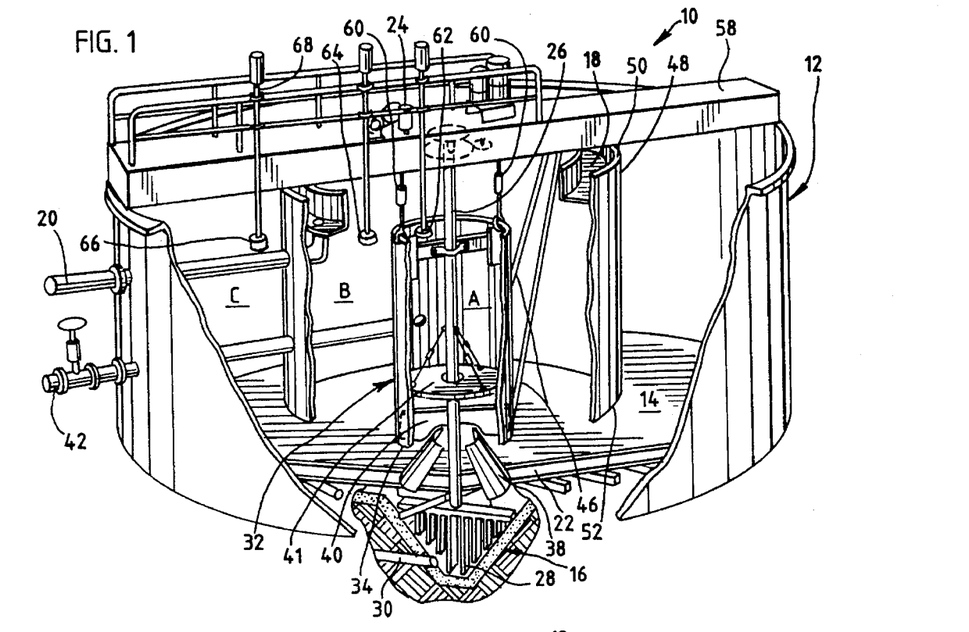
FIG. 1 is a perspective view of a recirculating solids clarifier incorporating the principles of the present invention with portions of the clarifier broken away to illustrate internal details thereof.

Referring to FIG. 1, a water treating apparatus incorporating the features of the present invention is generally illustrated with the reference numeral 10. The apparatus 10 preferably is a recirculating solids clarifier that treats and clarifies liquids by sedimentation.

The apparatus 10 can be utilized for softening water by the cold lime-soda ash process or for the clarification of water containing suspended solids, color, and organic impurities by coagulation with alum or ferric sulfate or other coagulants. Coagulation and softening may be carried out simultaneously in this type of water treating apparatus 10.

The flocculated coagulants and/or precipitates formed within the apparatus 10 have an enormous surface area upon which the dissolved or colloidally dispersed impurities are absorbed. The suspended impurities are surrounded by the gelatinous precipitates and themselves become part of the precipitate, which settles to the bottom of the apparatus 10.

Briefly, to soften water by this process, lime (calcium hydroxide) is added to the water to precipitate the calcium bicarbonate as calcium carbonate and the magnesium salts as magnesium hydroxide. Soda ash (sodium carbonate) is added to the water to react with the calcium chloride and calcium sulfate originally present in the water as well as that formed by the reaction of lime with magnesium chloride and sulfate. The reaction of sodium carbonate with these salts forms calcium carbonate. Thus, the hardness (calcium and magnesium salts) originally present in the water is partially removed as the slightly soluble compounds, calcium carbonate and magnesium hydroxide, precipitate out.

Usually a coagulant such as alum, sodium aluminate, ferric sulfate or suitable polymer is employed in the treatment to assist in the separation of the turbidity, precipitates and other solids formed from the water. If sterilization and reduction in organic matter are required, chlorine is also used in the treatment. By suitable modification in the chemical treatment, silica reduction can be obtained.

Although the present invention will be described with particular reference to a recirculating solids contact clarifier, it is to be understood that the present invention can be utilized with virtually any other type of sedimentation apparatus employing one or more liquid treatment zones in a single vessel or multiple vessels. For example, the present invention may be utilized with a lamella-type clarifier and sludge thickeners as well as biological and sludge blanket clarifiers, among other systems. Accordingly, the scope of the present invention is not to be limited to a particular type of sedimentation apparatus.

Figure 2:
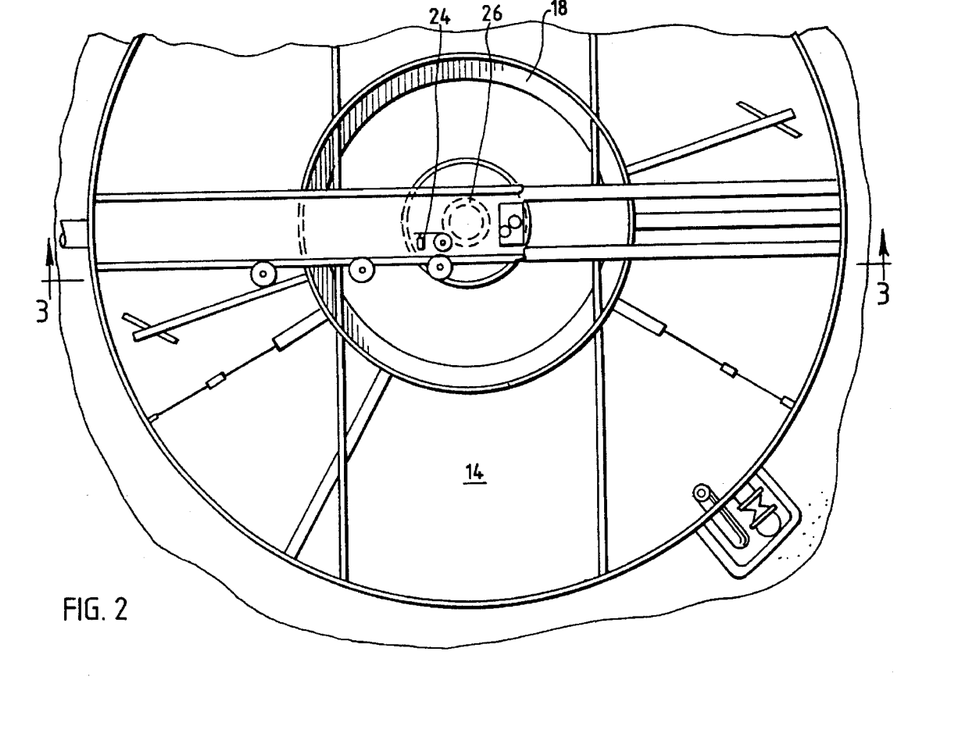
FIG. 2 is a top plan view of the clarifier of FIG. 1.
Figures 3, 4:
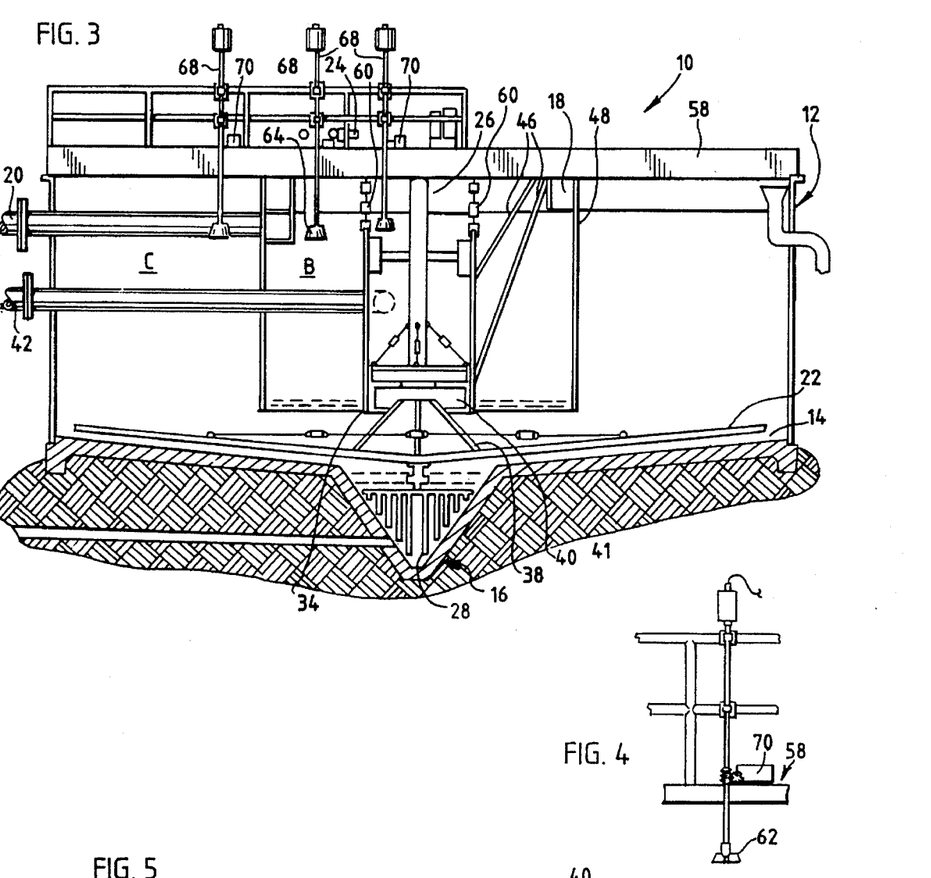
FIG. 3 is a cross-sectional view of the clarifier taken along line 3—3 of FIG. 2.
FIG. 4 is an enlarged side elevational view of a portion of the clarifier of FIG. 1 illustrating the positioning and mounting of the measuring devices utilized in the present invention.

As FIGS. 1–3 illustrate, the apparatus 10 includes a cylindrical open-topped tank 12 having a conical bottom 14 which slopes downward to a conical sump 16 where settled solids are collected. To collect treated water for discharge, an overflow weir 18 is provided proximate an upper edge of the tank 12 which determines the upper level of the water in the tank 12 and discharges treated water out of the apparatus 10 through an outlet line 20.

In order to push settled solids toward the sump 16, the tank 12 includes a rake 22 adjacent the bottom 14 which is driven by a motor 24 through a drive shaft 26 which extends through the center of the tank 12. Paddles or "thickening pickets" 28 also are connected to the shaft 26 within the sump 16 for circulating the solids collected in the sump 16 which eventually are removed from the sump for disposal through sludge discharge outlet 30.

The tank 12 includes a central, cylindrical, open-ended vertically oriented uptake or updraft tube 32 positioned therein coaxial with the drive shaft 26. The updraft tube 32 includes a bottom edge 34, which terminates above the rake 22 and a top edge 36 which terminates below the level of water in the tank 12 established by the weir 18. To direct the flow of solids into the updraft tube 32, the bottom edge 34 can be formed to include a conical updraft tube extension 38.

To circulate water within the tank 12 and provide an upward flow within the updraft tube 32, a recirculator or impeller 40 preferably is provided within the updraft tube 34 connected for rotation with the shaft 26. The impeller 40 is connected to the shaft 26 just below a circular disc 41 which maintains approximately a ⅛ clearance between the updraft tube 32.

Alternatively, to circulate water as desired, the recirculator 40 can be replaced with a hydraulic water circulation member having a plurality of nozzles as illustrated in above-referenced U.S. Pat. Nos. 3,473,665 and 3,951,806, or any other member so long as the desired water circulation is provided.

To fill the tank 12 and provide a supply of water or "influent", a water inlet line 42 is connected between a pressurized source of water (not illustrated) and the interior of the updraft tube 32. The rate of flow of the influent can be controlled within the apparatus 10 as described below.

Due to the upward flow created by the impeller 40 in the updraft tube 32, water from the inlet line 42 flows rapidly up and out of the top 36 of the updraft tube 32. This flow draws settled solids from the bottom 14 of tank 12 into the bottom 34 of updraft tube 32 and forces the settled solids up through the updraft tube 32 and out the top 36 with the incoming water.

Accordingly, the inside surface of the updraft tube 32 defines a first solids uptake zone hereinafter referred to as reaction zone A for transporting previously settled solids into the upper part of tank 12. Water treating chemicals may be mixed with the incoming water and fed into the updraft tube 32 through the water inlet 42.

Chemicals also can be separately provided within the updraft tube 32 through chemical feed lines 46. The number of feed lines 46 preferably varies between two and six, but it is conceivable that any desired number of feed lines 46 can be utilized.

A cylindrical baffle 48 surrounds and is coaxial with the updraft tube 32 and includes an upper end 50 and a lower end 52. The upper end 50 extends slightly above the upper level of the water in tank 12 while the lower end 52 terminates above the bottom 34 of the updraft tube 32.

The inside surface of the baffle 48 defines a second generally annular solids mixing and recirculation zone hereinafter referred to as flocculation or "floc" zone B which extends above and around the updraft tube 32 within the confines of the baffle 48. The turbulent liquid flow in reaction zone A within the updraft tube 32 mixes the treatment chemicals and the incoming water from inlet line 42 with the previously settled solids from the bottom 14 of the tank 12.

The previously settled solids will adhere to newly formed precipitates and to solids that enter with the water and thereby increase the overall solids settling rate of the apparatus 10 when the previously settled solids are present in the proper ratio. The outer surface of baffle 48 and the inside surface of tank 12 define a third solids separation, settling or sedimentation zone hereinafter referred to as separation zone C that surrounds the baffle 48 and the updraft tube 32.

In order to support the updraft tube 32 and the baffle 48 within the interior of the tank 12, a structural support member 58 in the form of a walkway spans the top of the tank 12. The updraft tube 32 is suspended from the walkway 58 by cables or chains 60 while the baffle 48 is secured directly to the walkway 58, such as by welding or with fasteners.

A primary concern when using a recirculating suspended solids clarifier is the concentration of solids at various points in the tank 12, such as within the reaction zone A, floc zone B and separation zone C. Once the apparatus 10 is filled with water, various inputs are initially established and the concentration of suspended solids is determined at desired positions within the tank 12. If the suspended solids concentration is not acceptable, the inputs are adjusted on a trial-and-error and/or previous history basis until the desired solids concentrations are established and the apparatus 10 is processing water.

In order to provide some type of steady-state operation of the apparatus 10, the suspended solids concentrations must be monitored periodically by an operator and manual adjustments must be made as necessary. These adjustments also are made on a trial-and-error and/or previous history basis.

In existing recirculating solids clarifier systems, the suspended solids concentrations are determined by manually drawing samples of the water from various points within the tank 12. The samples then are analyzed in a laboratory, which may be on or off-site, and the adjustments are made to the system based on the laboratory results and experience.

More particularly, to analyze the water samples a test known as a "10 minute V/V" test is performed on the sample. The V/V test includes drawing a sample of water in a 100 ml graduated cylinder, waiting 10 minutes and then measuring the height of the solids or "sludge" settled in the bottom of the graduated cylinder. The height of sludge within the graduated cylinder indicates the concentration of suspended solids of the sample.

Relying on such manual sample testing to determine suspended solids concentrations is very unreliable. Samples must not only be taken frequently, but are prone to human error in analysis and interpretation of the test results.

In the present invention, steady-state operation of the apparatus 10 substantially is obtained by employing three measuring devices or sensors 62, 64 and 66, one each positioned in the reaction zone A, floc zone B and separation zone C, respectively. Each sensor 62, 64 and 66 is suspended from the walkway 58 by a rod or cable 68 and may be fitted with a motor 70, illustrated in FIG. 3, for positioning the sensors 62, 64 and 66 at various heights within the tank 12. More or less sensors, however, can be utilized.

The sensors 62, 64 and 66 preferably are ultrasonic sensors, such as those available from Royce Instrument Corporation of New Orleans, La., U.S.A., Model #2500. It is to be understood, however, that a variety of sensors, either ultrasonic or any other type of sensor, can be utilized with the system of the present invention so long as they function as described herein.

Figure 5:
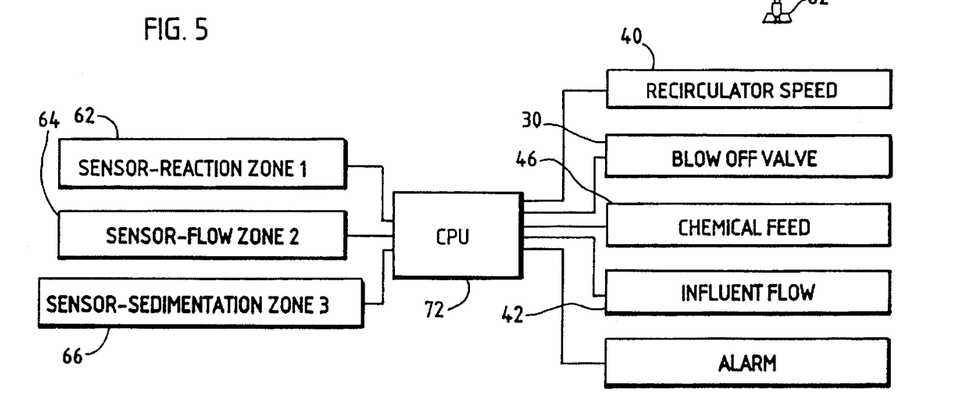
FIG. 5 is a simple schematic diagram illustrating the cooperation between the components of the present invention.

As FIG. 5 illustrates, the electrical outputs of sensors 62, 64 and 66 are fed to a computer or central processing unit (CPU) 72 which performs a variety of algorithms on the outputs of the sensors. The end result of such algorithms enables the CPU 72 to control the recirculator 40, chemical feeds 46, sludge valve 30 and modulate inlet flow which are electrically connected to the CPU 72.

The particular ultrasonic sensor utilized for sensors 62, 64 and 66 of the present invention generates a curve which depicts the relative differential sludge concentration and suspended solids level of the particular zone being analyzed verses the distance from the bottom 14 of the tank 12 to the sensor. The curve provides an indication where sludge concentrations change the most with respect to the bottom 14 of the tank 12. Further details with regard to the output of the sensors 62, 64 and 66 will be provided herein.

Figure 6:
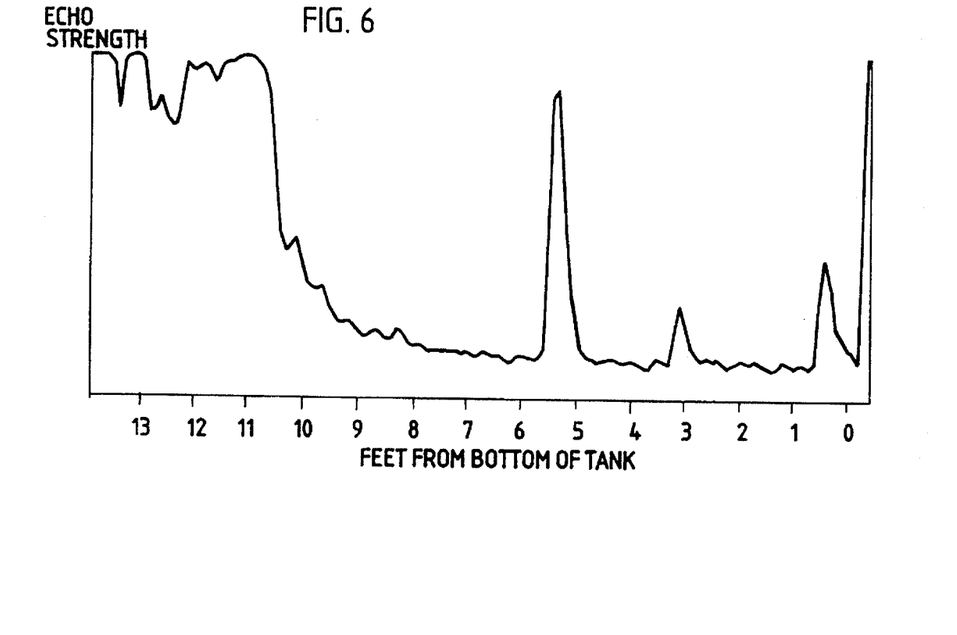
FIG. 6 is a graph depicting the output of the sensors utilized with the present invention.

As FIG. 6 illustrates, the sensors 62, 64 and 66 preferably provide an output which indicates the differential sludge concentration of a zone being analyzed versus the distance from the bottom 14 of the tank 12. The differential density is depicted in FIG. 6 as echo strength and provides an indication where densities or the concentration of solids change with respect to the bottom 14 of the tank 12. For example, at approximately 5.3 feet from the bottom 14 of the tank 12, the output depicts a relatively large change in density or solids concentration as represented by the change in echo strength.

In evaluating the outputs of the sensors 62, 64 and 66, the CPU 72 performs several algorithms on the outputs, including, but not limited to, establishing the average density by successive summation of the echo strength values by integration or the like, evaluating and comparing integrals to set points entered into the CPU 72, subtraction, addition and evaluating and comparing differential gains, particularly with respect to various heights within the tank 12. It will be appreciated that the algorithms and programming of the CPU 72 utilized are well within the abilities of one skilled in the art of such control systems.

Figure 7:
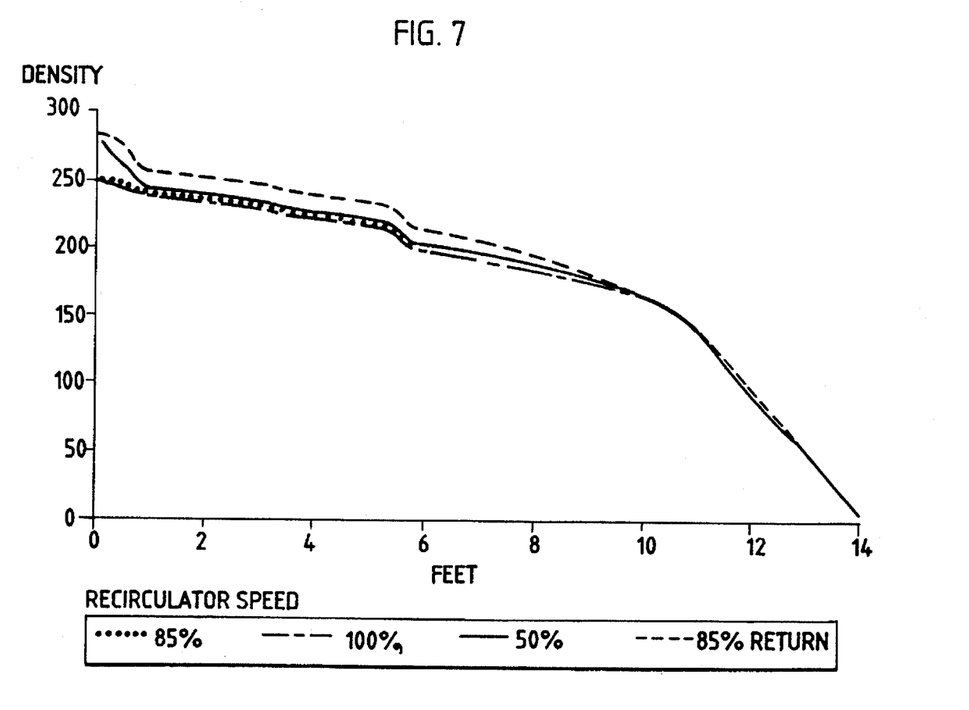
FIG. 7 is a graph depicting the average relative sludge concentration within a portion of the tank at various recirculator speeds.
Figure 8:
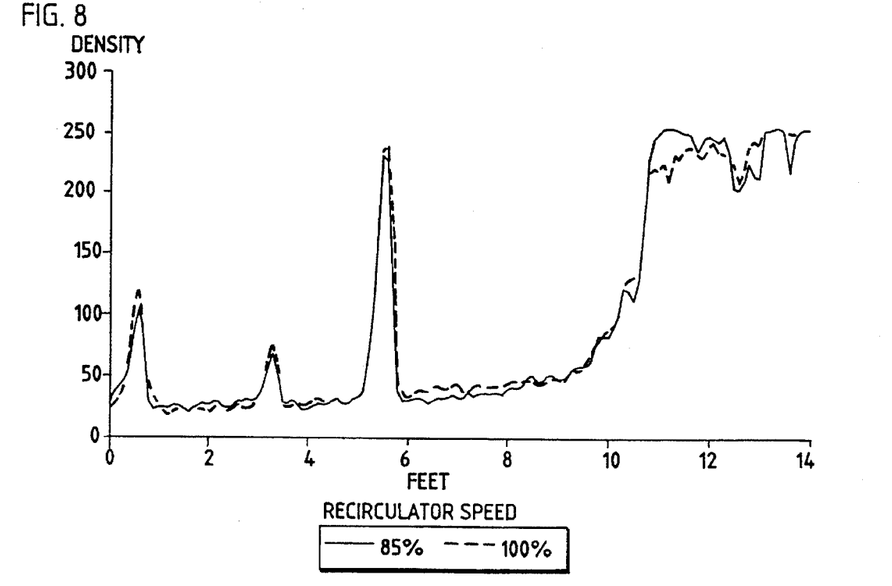
FIG. 8 is a graph depicting changes in density at two recirculator speeds.

FIG. 7 generally illustrates the average relative densities within the tank 12 for various recirculator speeds. FIG. 8 generally illustrates a combination of the differential density graph of FIG. 6 with the average density graph of FIG. 7, where the x-axis is labeled with data points which directly relate to height within the tank 12.

In operation, the tank 12 is filled with water from fluid inlet 42. As the tank 12 is being filled, the shaft 26 preferably is activated to begin rotation of the recirculator 40 and chemicals are added by way of the chemical inlet lines 46 to initiate operation before the tank 12 is completely filled. Once the tank 12 is filled to approximately the level of the weir 18, processing of the water begins.

A detailed explanation of the operation of the apparatus 10 now will be provided. For clarity, the operation will be described in four sections: recirculator rate control, blow down initiation and conclusion, carry over and chemical feed.

I. RECIRCULATOR RATE CONTROL

Once the tank 12 is initially filled or charged with water to be treated, the speed of the recirculator 40, the type and amount of chemicals provided in chemical feed lines 46 and the frequency and duration of blow down or opening of sludge outlet 30 are set to initial values. These initial values roughly are determined by the operator based on the size of the tank 12, flow rate and composition of the water to be treated.

For proper operation of the apparatus 10 and to prevent "floc shearing," a minimum optimum quantity of recirculating solids is maintained in the floc zone B by adjustment of the recirculator 40 to a minimum rate. This rate must be set to also provide uniform distribution of suspended solids in floc zone B. The optimum minimum quantity of recirculating solids is a predetermined value determined substantially as follows.

One or more samples are drawn from the floc zone B and tested using the V/V method described above to determine the concentration of suspended solids within the floc zone B. Preferably, the minimum level is based on obtaining the desired solids reduction. The main concern is obtaining uniformity between the top and bottom of floc zone B.

If the initial test determines that the percentage of suspended solids within the floc zone B is not uniform, the speed of the recirculator 40 is increased or decreased to respectively increase or decrease the suspended solids concentration profile and another sample is taken in the floc zone B. This trial-and-error process is repeated until the percentage of suspended solids within floc zone B is uniform.

Next, the same V/V test is conducted at two different levels within the reaction zone A. One sample is drawn proximate the top 36 of the updraft tube 32 and the other sample proximate the bottom 34 to determine the concentration of suspended solids at those points. Preferably, the differential between the concentration of suspended solids at the top 36 and the bottom 34 should be within 5–10% units of each other with the higher suspended solids concentration being toward the bottom 34.

If the differential does not fall within the desired range, the speed of the recirculator 40 is adjusted and measurements again are taken to determine the concentration differentials. This trial-and-error process is repeated until the desired differential within reaction zone A is attained.

It is to be noted that adjustment of the recirculator 40 to obtain the desired 5–10% units differential within reaction zone A may disturb the concentration of solids desired in floc zone B. Accordingly, floc zone B must be tested after the reaction zone A differential is established and the recirculator 40 adjusted accordingly if needed.

Once the concentration levels in the reaction zone A and floc zone B are established, the CPU 72 is given a plurality of set points for the outputs of the sensors 62, 64 and 66. If these set points are reached, the CPU 72 activates desired controls as described herein and schematically illustrated in FIG. 5.

With respect to the control of the recirculator 40, the CPU 72 preferably monitors two predetermined values and adjusts the speed of the recirculator 40 accordingly. The first value relates to maintaining the minimum optimum quantity of solids in the floc zone B initially established by the V/V test for obtaining target water quality. After the desired minimum quantity of solids is achieved, the output from sensor 64 is given a set point within the CPU 72 with respect to that minimum level of solids.

Should the output of sensor 64 decrease below the established set point, indicating a decrease in density and the level of suspended solids concentration in floc zone B, the CPU 72 increases the speed of the recirculator 40 until the sensor 64 reaches the set point which indicates that the desired minimum level of suspended solids is obtained. Maintaining the minimum level of suspended solids in the floc zone B enables complete utilization of the floc zone B.

The second value to be monitored by the CPU 72 and provide adjustment of the recirculator 40 relates to the suspended solids concentration differential within the reaction zone A. Once the differential is established during start-up, two sections of the output curve of the sensor 62 corresponding to the top 36 and bottom 34 of the uptake tube 32 are monitored by the CPU 72 and respective set points are established within the CPU 72. Should the differential fall below the set points, the speed of the recirculator 40 is increased to decrease the level of suspended solids within the reaction zone A and reestablish the desired differential.

II. BLOW DOWN INITIATION AND CONCLUSION

As solids collect in the bottom of the separation zone C, they periodically must be removed in order to maintain the desired suspended solids concentration in the apparatus 10. Two separate conditions relating to "blow down" must be monitored, namely blow down initiation and blow down conclusion.

For blow down initiation, a predetermined maximum value for the amount of suspended solids desired in the apparatus 10 is established as an initial value for triggering a blow down sequence. This maximum value of allowable suspended solids is calculated as the volume of solids or settled sludge which is maintained in the bottom of the separation zone C which does not interfere or become appreciably entrained in the velocity gradients of the liquid which flows from the floc zone B to the separation zone C.

In other words, a desired level of sludge is maintained in the bottom of the separation zone C. If this level gets too high, too much sludge may carry over in zone C to outlet pipe 20. Thus, a blow down must be initiated to reduce the sludge level and maintain the desired level of solids concentration.

Two methods are utilized to determine the proper level of solids in the separation zone C. One way is to determine the level of settled sludge with the third sensor 66 whose output is processed by the CPU 72 and, combined with the particular geometry or shape of the tank 12, enables the exact height of the settled sludge to be determined. If the level is too high, a set point within the CPU 72 is reached and a blow down will be initiated by the CPU 72 by opening sludge outlet 30.

The other way to initiate a blow down can be based on the output of sensor 62 in the reaction zone A, particularly the bottom 34 of reaction zone A. If the density indicated by sensor 62 at the bottom 34 exceeds a preset value or set point, the CPU 72 initiates a blow down by opening sludge outlet 30.

In order to conclude a blow down, two methods can be utilized. First, the output sensor 66 can be utilized by the CPU 72 to directly determine the height of the sludge in the separation zone C as in blow down initiation described above. Once a desired height is obtained, the output of sensor 66 is processed by the CPU 72 which exceeds a set point and concludes the blow down by closing sludge outlet 30.

A second way of concluding blow down is from a comparison of the difference in sludge heights measured by sensors 64 and 66 in the floc zone B and separation zone C respectively. If the difference in sludge height between sensors 64 and 66 is greater than a preset value or set point, the CPU 72 concludes the blow down by closing sludge outlet 30. This height differential between sensors 64 and 66 essentially indicates if water is being wasted to evacuate the solids.

This second method is particularly effective in detecting a condition known as "rat holing." Since the bottom 14 of the tank 12 tapers toward the center, sludge substantially is removed from the center of the tank 12. Preferably, an even drop in sludge height is desired across the floc zone B and separation zone C. If sludge in the inner floc zone B close to the sludge outlet 30 is draining faster than in the separation zone C, then more water is being removed with the sludge which is undesirable and referred to as rat holing.

If too much water is exiting the apparatus 10, then water is being wasted, not recycled, and the sludge is too loose. The goal is to have thick sludge being blow down or exiting the apparatus 10 to provide better recycling and lower cost of further processing of the sludge being evacuated.

It is to be noted that existing methods for blow down initiation and conclusion primarily are based on trial-and-error by monitoring the gallons of water going through a system. For example, for a particular flow rate determined by a flow indicator, the operator typically would determine an initial blow down frequency and duration schedule base on experience. Thereafter, the operator would monitor the effluent water exiting the system by outlet line 20 or manually determine the sludge level and determine if a correction to the blow down schedule was required.

It also is to be noted that existing systems have no way of actually detecting rat holing. In such existing systems, the sludge output is monitored and corrections made based solely on the composition of the sludge output. If the sludge is loose, the operator has no way of determining if it is due to rat holing or some other variable in the system.

III. CARRY OVER

The term "carry over" relates to the total solids leaving the unit in the treated water through outlet line 20. Sensor 66 in the separation zone C is utilized to evaluate the upper portion of the third sedimentation zone and detect the amount of suspended solids present at that point. The goal is to produce particles of high density and surface area so that such dense particles settle in separation zone C as fast as possible.

If sensor 66 detects more suspended solids at the top of the tank 12 compared to a pre set amount, one of two situations may be present. First, a set point in the CPU 72 is reached sounding an alarm to alert an operator that a change in the flow rate has occurred or is necessary. Alternatively, the flow rate can be automatically adjusted by the CPU 72 upon sounding of the alarm.

Second, a change in the suspended solids concentration detected by sensor 66 can be due to a change in temperature of the influent or water, measured at the water inlet 42, or to a rapid change in influent flow, both of which can change the density within the apparatus 10. In either event, a blow down sequence is initiated or the inlet flow of water is increased or decreased based on the reading from the middle of separation zone C. This situation typically occurs during rapid start up where it would be useful to provide some type of monitoring and control.

The blow down minimizes solids being swept up into the separation zone C by the rapid change in influent flow. By monitoring the height of the sludge in the middle or center of the separation zone C the influent rate is controlled based on a desired concentration of suspended solids.

It is to be noted that directly measuring the suspended solids concentration of the carry over, or the solids in separation zone C in relation to carry over, has not been provided in existing systems. Thus, no continuous, automatic and substantially instantaneous carry over measuring, warning or adjustment system has been provided in the past to indicate the existence of a carry over problem.

Existing clarifiers determine a carry over problem in one of two ways. First, a turbidity meter, which is a light activated device, has been utilized to determine water clarity. Such devices, however, are not good indicators of suspended solids or solids concentration levels, are not consistent and only provide a relative indication of the suspended solids at that particular position.

Second, carry over problems have been detected by visual examination of a filter provided at the treated water exit. Once an operator notices a filter has become clogged, the filter is removed, cleaned and monitored for about twelve hours. If the filter becomes clogged again within the twelve hour period, a problem exists and adjustments are made to the system. The filter again is monitored for twelve hours to evaluate whether the system changes were effective.

IV. CHEMICAL FEED

During start up, the type of influent or water is identified by water analysis, jar test and experience to initially determine the chemicals needed for clarification of that particular influent. Once the initial chemical feed levels are determined, they are entered in the CPU 72 to be utilized in determining whether a proper chemical feed is being maintained.

For example, if the influent needs to be softened, lime typically is added. The initial analysis roughly determines how much lime to add. In existing clarifiers, once the system is running, the quality of the treated water is checked by manual inspection or testing and adjustments are made to obtain the desired quality, in this case water softness. Such a control method, however, can take over twelve hours before the water quality can be properly evaluated.

In the present invention, two approaches can be utilized to accurately and substantially simultaneously determine whether the proper amount of chemicals are being employed with the influent. In the first approach, the density data obtained by sensor 62 in the reaction zone A can be utilized to instantly determine whether the chemical feed determined at start up is proper or if the feed of chemicals in interrupted. In such a system, an alarm can be activated by the CPU 72 to alert an operator who in turn adjusts the chemical feed, examines any change in reaction zone A by monitoring of the output of sensor 62 and makes further adjustments if necessary.

In a second approach, injection point monitoring may be utilized since the density information provided by sensor 62 varies upon addition of certain chemicals or chemical combinations. During testing, it was determined that changes in the output from sensor 62 in the reaction zone A occurred at specific heights with respect to a specific chemical being added.

Figure 9:
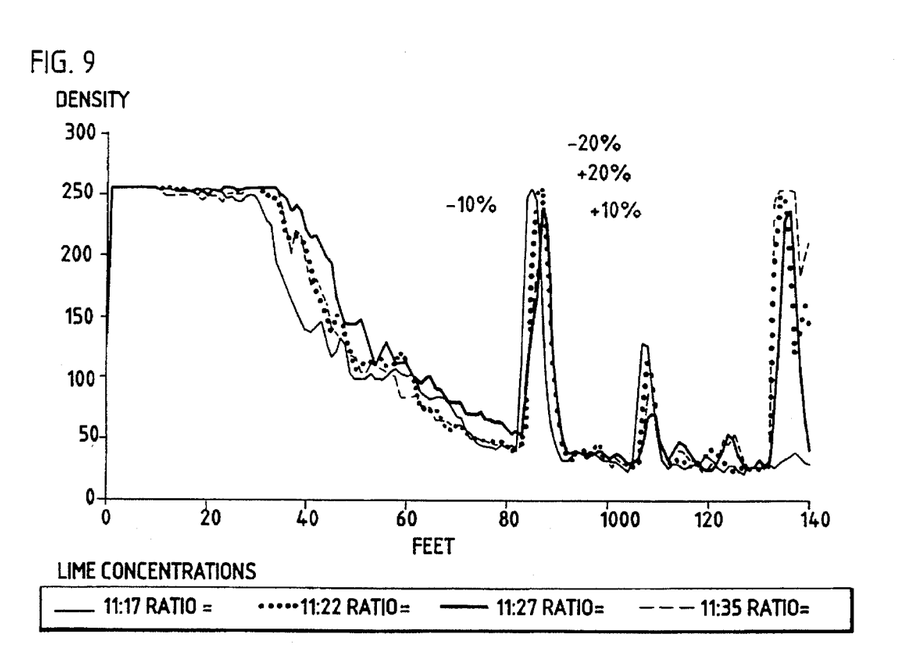
FIG. 9 is a graph depicting changes in density for various concentrations of lime.

For example, when lime dosage was changed, the peak in the density curve of sensor 62 occurred at a height of say four feet from the bottom 34 of the updraft tube 32 in the reaction zone A. When soda ash was added, the peak in the density curve of sensor 62 occurred at a different height, say two feet from the bottom 34 of the updraft tube 32 in the reaction zone A. FIG. 9 generally illustrates the change in density within reaction zone A at various concentrations of lime.

As a consequence, the present invention enables sensor 62 to verify whether a desired increase in the amount of chemical introduced into the reaction zone A did in fact occur based on the occurrence of a peak on the output of sensor 62 at a level associated with that chemical. Additionally, by such "injection point monitoring," an operator can be alerted that a change in the chemical feed is needed by a change in the output of sensor 62.

Accordingly, the presence and magnitude of a change in density or peak in the output of sensor 62 can be utilized to add a particular chemical, verify the introduction of a particular chemical or adjust a particular chemical input. None of these features have been available for existing clarifiers.

It is to be noted that the CPU 72 not only monitors and controls the recirculator rate, blow down initiation and conclusion, carry over and chemical feed as described above, but further monitors and controls these variables with respect to each other to provide the desired optimum operating conditions. For example, before the CPU 72 opens the sludge outlet 30 based on information obtained by sensor 62 in reaction zone A, it can include an evaluation of sensors 64 and 66 to correlate the height of the sludge before opening the sludge outlet 30. If the sludge height is within prescribed limits, no opening of the sludge outlet 30 will occur and another variable such as recirculator rate, chemical feed, carry over or the like will be analyzed, with or without the passage of time, to enable a previous change in a variable to take effect.

Although the above description has been provided with regard to a recirculating solids contact clarifier, the scope of the claims is not to be limited to the type of water treatment apparatus utilized. Additionally, although the invention has been described with respect to a water treatment apparatus having multiple zones within a single vessel, the invention can be utilized with any other water treatment apparatus including those with separate vessels for such respective zones.

It also is to be noted that the term "zones" as used in the patent specification and/or claims can be utilized with one or more separate vessels in fluid communication. Furthermore, the term "zones" can refer to one or more functions provided in the same vessel at different times.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. The disclosure is intended to cover by the appended claims all such modifications as fall within the scope of the claims.

We claim:

1. An automatic feedback control system for use with a recirculating solids contact clarifier having a reaction zone, a flocculation zone, a separation zone, a raw water inlet, a treated water outlet, a recirculator member, an adjustable chemical inlet and an adjustable sludge blow off outlet, comprising:

first, second and third suspended solids concentration measuring devices, one device each for the respective reaction, flocculation and separation zones, each of said devices providing a substantially continuous output which provides an indication of the amount of suspended solids present at least at a particular portion of said respective reaction, flocculation and separation zones; and an automatic regulator member in operable communication with said first, second and third measuring devices and with the recirculator member, adjustable chemical inlet and adjustable sludge blow off outlet, said regulator member capable of detecting a difference between established set points and said outputs of said first, second and third measuring devices and automatically adjusting at least one of said recirculator member, said adjustable chemical inlet and said sludge blow off outlet to adjust the level of solids within the clarifier to an optimum level.

2. An apparatus in accordance with claim 1 wherein said first, second and third measuring devices provide an indication of the amount of suspended solids across the entire depth of a respective reaction, flocculation and separation zone.

3. An apparatus in accordance with claim 1 wherein said measuring devices are ultrasonic sensors.

4. An apparatus in accordance with claim 1 wherein said automatic regulator is a CPU.

5. An apparatus in accordance with claim 1 wherein said automatic regulator member includes means to activate an alarm upon detecting said difference to alert an attendant.

6. An apparatus in accordance with claim 1 wherein said raw water inlet is adjustable and said automatic regulator can adjust said raw water inlet based upon the output of at least one of said first, second and third sensors.

7. An apparatus in accordance with claim 6 wherein said regulator member includes means to automatically adjust said raw water inlet to decrease the flow of raw water into the apparatus upon detecting an output of said third measuring device indicating that the suspended solids concentration of at least one of a top portion or an intermediate portion of the separation zone has risen above an established set point.

8. An apparatus in accordance with claim 6 wherein said regulator member includes means to automatically adjust said raw water inlet to increase the flow of raw water into the apparatus upon detecting an output of said third measuring device indicating that the suspended solids concentration of at least one of a top portion or an intermediate portion of the separation zone has fallen below an established set point.

9. An apparatus in accordance with claim 1 wherein said regulator member includes means to automatically increase the recirculation rate of said recirculator to increase the suspended solids concentration in the reaction zone upon detecting an output of said first measuring device indicating that a suspended solids concentration differential between a top portion and a bottom portion of the reaction zone has fallen below an established set point.

10. An apparatus in accordance with claim 1 wherein said regulator member includes means to automatically decrease the recirculation rate of said recirculator to decrease the suspended solids concentration in the reaction zone upon detecting an output of said first measuring device indicating that a suspended solids concentration differential between a top portion and a bottom portion of the reaction zone has risen above an established set point.

11. An apparatus in accordance with claim 1 wherein said regulator member includes means to automatically increase the recirculation rate of said recirculator to increase the suspended solids concentration in the flocculation zone upon detecting an output of said second measuring device indicating that the suspended solids concentration of the flocculation zone has fallen below an established set point.

12. An apparatus in accordance with claim 1 wherein said regulator member includes means to automatically decrease the recirculation rate of said recirculator to decrease the suspended solids concentration in the flocculation zone upon detecting an output of said second measuring device indicating that the suspended solids concentration of the flocculation zone has risen above an established set point.

13. An apparatus in accordance with claim 1 wherein said regulator member includes means to automatically open the sludge blow off outlet to decrease the amount of suspended solids concentration in the bottom of the reaction zone upon detecting an output of said first measuring device indicating that the suspended solids concentration at a bottom portion of the reaction zone has risen above an established set point.

14. An apparatus in accordance with claim 1 wherein said regulator member includes means to automatically open the sludge blow off outlet to decrease the height of the sludge within the bottom of the separation zone upon detecting an output of said third measuring device indicating that the settled solids concentration at a bottom portion of the separation zone has risen above an established set point corresponding to the height of sludge within the bottom of the separation zone.

15. An apparatus in accordance with claim 1 wherein said regulator member includes means to automatically determine whether the sludge blow off outlet is open, and if so, closes the sludge blow off outlet to enable the height of the sludge to begin to increase upon detecting an output of said third measuring device indicating that the suspended solids concentration at a bottom portion of the separation zone has fallen below an established set point corresponding to the height of sludge within the bottom of the separation zone.

16. An apparatus in accordance with claim 1 wherein said regulator member including means to automatically determine whether the sludge blow off outlet is open, and if so, closes the sludge blow off outlet upon comparing the outputs of said second and third measuring devices indicating that a solids concentration differential at the bottom of the respective flocculation and separation zones has fallen below an established set point corresponding to the heights of the sludge within the bottom of the flocculation and separation zones.

17. An apparatus in accordance with claim 1 wherein said regulator member includes means to determine what chemical needs to be added to the reaction zone and automatically adds that chemical in predetermined amounts thereto upon detecting an output of said first measuring device indicating that the suspended solids concentration of one or more portions of said reaction zone has changed.

* * * * *